(12) United States Patent (10) Patent No.: US 8,953,606 B1
McGlaughlin et al. (45) Date of Patent: Feb. 10, 2015

(54) FLEXIBLE EDGE ACCESS SWITCH AND ASSOCIATED METHODS THEREOF

(75) Inventors: Edward C. McGlaughlin, Minneapolis, MN (US); Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 514 days.

(21) Appl. No.: 13/433,146

(22) Filed: Mar. 28, 2012

Related U.S. Application Data

(60) Provisional application No. 61/537,498, filed on Sep. 21, 2011.

(51) Int. Cl.
*H04L 12/28* (2006.01)
*H04L 12/931* (2013.01)
*H04L 12/741* (2013.01)

(52) U.S. Cl.
CPC ............. *H04L 49/357* (2013.01); *H04L 45/74* (2013.01)
USPC ........... 370/392; 370/229; 370/329; 370/389; 370/401; 455/63.1; 455/226.1

(58) Field of Classification Search
None
See application file for complete search history.

(56) References Cited

U.S. PATENT DOCUMENTS

| | | | |
|---|---|---|---|
| 8,351,442 B1* | 1/2013 | McGlaughlin | 370/401 |
| 2008/0159277 A1* | 7/2008 | Vobbilisetty et al. | 370/357 |
| 2008/0175154 A1* | 7/2008 | Ong et al. | 370/236 |
| 2009/0092141 A1* | 4/2009 | Banerjee | 370/397 |

* cited by examiner

*Primary Examiner* — Ian N Moore
*Assistant Examiner* — Latresa McCallum
(74) *Attorney, Agent, or Firm* — Klein, O'Neill & Singh, LLP (57) ABSTRACT

A network device is provided. The network device includes a processor having access to a memory storage device storing instructions for execution by the processor; and a first flexible port having a physical layer that can be configured to operate as a first link type or a second link type based on a control signal sent by the processor. The first flexible port receives a packet from the computing system. The first flexible port determines an egress flexible port for transmitting the packet to its destination. A routing module generates a route control tag for the packet that includes an identifier identifying the egress flexible port, a location identifier identifying where the packet is stored at the first flexible port and a translation identifier identifying an action that is to be performed on the packet at the egress port before sending the packet to the destination.

18 Claims, 8 Drawing Sheets

| Routing Module 152 | |
|---|---|
| Pattern Match | Route Control Tag |
| Predefined Segment 152A<br><br>Ether Type = FIP  234A<br>Ether Type = LLDP  234B | Egress = Processor  236A<br>Egress = Processor  236B |
| Dynamically Defined Segment 152B<br><br>SMAC = Value  238<br>FC FCID = VALUE  242 | Egress = Value  240<br>Egress = Value  244 |
| Default Segment 152C<br><br>SMAC = Don't care  246 | Egress = Processor  248 |

FLEXIBLE EDGE ACCESS SWITCH AND ASSOCIATED METHODS THEREOF

CROSS-REFERENCE TO RELATED APPLICATION

This patent application claims priority under 35 USC 119(e) to the U.S. Provisional Patent Application Ser. No. 61/537,498, entitled "Flexible Edge Access Switch and Associated Methods Thereof" filed on Sep. 21, 2011, the disclosure of which is incorporated herein by reference in its entirety.

TECHNICAL FIELD

The present embodiments relate to networks.

BACKGROUND

A computer network, often simply referred to as a network, typically includes a group of interconnected computers and devices that facilitate communication between users, and that allow users to share resources. Adapters, switches and other devices are typically used during network communication. Continuous efforts are being made to improve network communication.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide advantages.

In one embodiment, a network device is provided. The network device includes a processor having access to a memory storage device storing instructions for execution by the processor; and a first flexible port having a physical layer that can be configured to operate as a first link type or a second link type based on a control signal sent by the processor. The first flexible port is coupled to a computing system using the first link type and receives a packet from the computing system.

The first flexible port determines an egress flexible port for transmitting the packet to its destination and a routing module generates a route control tag for the packet, the route control tag includes an identifier identifying the egress flexible port, a location identifier identifying where the packet is stored at the first flexible port and a translation identifier identifying an action that is to be performed on the packet at the egress port before sending the packet to the destination.

In another embodiment, a network device is provided. The network device includes a processor having access to a memory storage device storing instructions for execution by the processor; a first flexible port having a physical layer that can be configured to operate as a first link type or a second link type based on a control signal sent by the processor; and an egress flexible port communicating with the first flexible port via a crossbar, the egress port having a physical layer that can be configured to operate as a first link type or a second link type based on a control signal sent by the processor.

The first flexible port includes a routing module for generating a route control tag to a packet received by the first flexible port, the route control tag includes an identifier identifying the egress flexible port, a location identifier identifying where the packet is stored at the first flexible port and a translation identifier identifying an action that is to be performed on the packet at the egress port before sending the packet to the destination.

When the first flexible port is configured to operate as a server port for traffic, the routing module stores an ether type in a pre-defined segment of the routing match and a default segment is set to a wildcard setting for learning a media access control address (MAC) of incoming packets. When the first flexible port is configured to operate as a storage area network port or a local area network port, then the default segment is set without MAC learning.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software (or firmware) implementation, the terms "logic," "module," "component," "system," and "functionality" represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be non-transitory computer storage media, readable by a computer device, and encoding a computer program of instructions for executing a computer process. The computer program product may also be readable by a computing system, and encoding a computer program of instructions for executing a computer process.

Figure 1A:
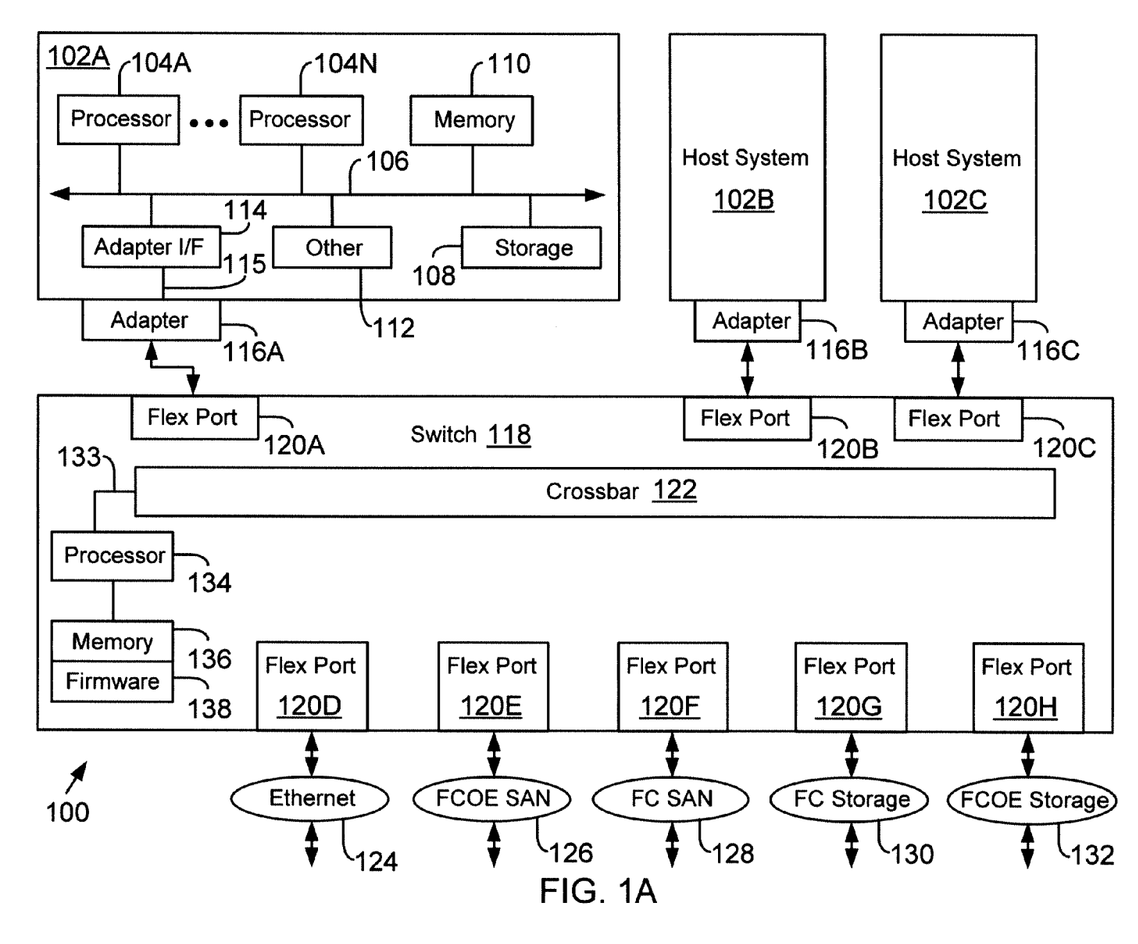
FIG. 1A shows a block diagram of a system using a switch with Flex Ports, according to one embodiment.

System 100: FIG. 1A is a block diagram of a system 100 for implementing the various embodiments disclosed herein. In one embodiment, system 100 may include a plurality of computing system 102A-102C (may also be referred to as host system 102 or initiator 102) communicating with other devices via adapters 116A-116C (generically referred to as "adapter 116") and switch 118 that is described below in more detail, according to one embodiment.

There may be other systems/components that may be placed between the aforementioned components but they are not germane to the embodiments disclosed herein. It is noteworthy that the embodiments disclosed herein are not limited to any particular number of computing systems, switches or adapters.

Host system 102 may include one or more processors 104A-104N (jointly referred to as processor 104), also known as a central processing unit (CPU), interfacing with other components via an interconnect (also referred to as a bus) 106. Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of interconnect.

Host system 102 may also include a storage device 108, which may be for example a hard disk, a CD-ROM, a non-volatile memory device (flash or memory stick) or any other type of storage device. Storage device 108 may store processor executable instructions and data, for example, operating system program files, application program files, and other files. Some of these files are stored on storage 108 using an installation program. For example, the processor 104 may execute computer-executable process steps of an installation program so that the processor 104 can properly execute the application program.

Host system 102 interfaces with a memory 110 that may include random access main memory (RAM), and/or read only memory (ROM). When executing stored computer-executable process steps from storage device 108, the processor 104 may store and execute the process steps out of memory 110.

Host system 102 may also include other devices and interfaces 112, which may include a display device interface, a keyboard interface, a pointing device interface and others.

Host system 102 may also include an adapter interface 114 to interface with adapter 116 via a link 115 that may be a peripheral bus, for example, a PCI, PCI-X or PCI-Express link or any other type of interconnect system. Adapter 116 may be configured to handle both network and storage traffic using various network and storage protocols. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein is based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (may also be referred to as "FC"). Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port. As an example, adapter 116B may be a Fibre Channel host bus adapter for handling SCSI, FOP and SAN based traffic.

A new and upcoming standard, called Fibre Channel over Ethernet (FCoE) has been developed to handle both Ethernet and Fibre Channel traffic in a storage area network (SAN). This functionality would allow Fibre Channel to leverage 10 Gigabit Ethernet networks while preserving the Fibre Channel protocol. Adapter 116A may be configured to operate as an FCoE adapter. QLogic Corporation, the assignee of the present application, provides one such adapter. Those of ordinary skill in the art will appreciate, however, that the present embodiments are not limited to any particular protocol.

Referring back to FIG. 1A, switch 118 includes a plurality of ports 120A-120H that may also be referred to as "Flex Ports", according to one embodiment. The term Flex Port as used herein means a port having logic and circuitry for sending and receiving information to other devices and ports. A Flex Port is able to perform physical level packet conversion in a multi-protocol environment, as described below in more detail.

As an example, Flex Port 120A is coupled to adapter 116A of host system 102A, Flex Port 120B is coupled to adapter 116B of host system 102B and Flex Port 120C is coupled to host system 102C. Flex Port 120D may be coupled to an Ethernet network 124, Flex Port 120E may be coupled to an FCoE Storage Area Network ("SAN") 126 and Flex Port 120F may be coupled to a Fibre Channel SAN 128. Flex Port 120G may be coupled to Fibre Channel storage 130, while Flex Port 120H may be coupled to FCoE storage 132. Flex Ports 120A-120H use crossbar 122 for any inter-port communication.

Switch 118 may also include a processor 134 for executing programmable instructions (for example, firmware 138) out of memory 136. In one embodiment, firmware 138 includes the embodiments or portions thereof described below in more detail.

In one embodiment, host system 102A uses adapter 116A to send information via an enhanced Ethernet connection. Flex Port 102A receives the information, parses header information and then determines a route and an egress using the techniques described below. Based on the selected route, a possible egress port may be Flex Port 120D for accessing Ethernet network 124, Flex Port 120E for accessing FCoE SAN 126, Flex Port 120F for accessing Fibre Channel SAN 128, Flex Port 120G for accessing Fibre Channel storage 130, Flex Port 120H for accessing FCoE storage 132 or Flex Port 120B or 120C for sending information to host system 102B or host system 102C, respectively.

In another embodiment, host system 102B may use adapter 116B as a Fibre Channel HBA to send information to Flex Port 120B via a Fibre Channel connection. Flex Port 102B in this case may add an Ethernet header and interpret the header of the Fibre Channel packet to determine a route and an egress port, as described below in more detail. Based on the route, a possible egress port may be Flex Port 120E for accessing FCoE SAN 126, Flex Port 120F for accessing Fibre Channel SAN 128, Flex Port 120G for accessing Fibre Channel storage 130 and Flex Port 120H for accessing FCoE storage 132.

Figure 1B:
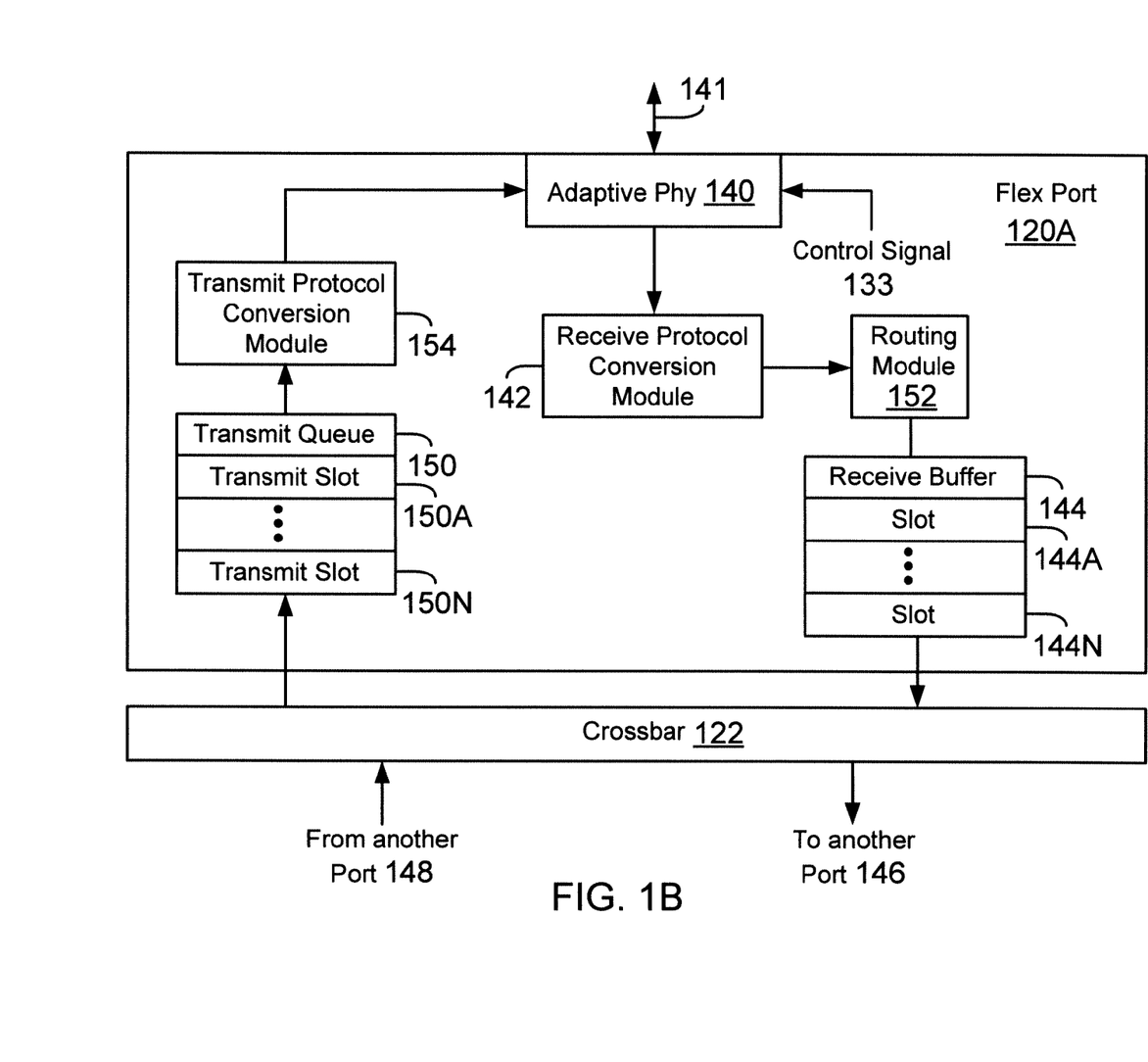
FIG. 1B shows a block diagram of a Flex Port, according to one embodiment.

FIG. 1B shows an example of a Flex Port 120A, according to one embodiment. Flex Port 120A includes an adaptive PHY 140 that can be configured to operate as an Ethernet or Fibre Channel link based on a control signal 133 from processor 134. Adaptive PHY 140 receives packets via link 141 and then forwards the packets to a receive protocol conversion module 142 that operates in an Ethernet pass-through mode or Fibre Channel to Ethernet conversion mode, depending on the control signal 133 from processor 134. In the Ethernet pass through mode, received packets are forwarded without any modification. In the Fibre Channel to Ethernet conversion mode, the received Fibre Channel packets are encapsulated with an Ethernet header (214, FIG. 2A), an FCoE prefix header (216A, FIG. 2A) and Ethernet FCS (218, FIG. 2A).

The received packets are passed to a routing module 152, according to one embodiment. The routing module 152 performs a pattern match based on a stored routing data structure (may also be referred to as a routing table), classifies the packet type and generates a route control tag (200, FIG. 2A) for packet so that it conforms to an Extended Ethernet Packet format 201 described below with respect to FIG. 2A. The routing module 152 then selects a location from among 144A-144N of receive buffer 144 to place the frame. In one embodiment, the receive buffer 144 is a temporary storage device having a plurality of locations for storing outgoing packets.

The routing tag generated by routing module 152 is used to select an egress port from among the various ports of switch 118. Once the port is selected, the frame is routed to the selected port via crossbar 122. In one embodiment, an egress port identifier (206, FIG. 2A) is used to select the egress port. It is noteworthy that the received frame may be sent to processor 134, based on the egress port identifier.

Packets from other Flex Ports may be received via path 148 and crossbar 122. The received packets are received and placed at a transmit queue 150 having a plurality of memory storage locations 150A-150N for storing packets. The memory storage locations may also be referred to as memory slots.

Packets from transmit queue 150 are sent to a transmit protocol conversion module 154 that performs an operation depending on its mode of operation. For example, when operating in the Fibre Channel mode, transmit protocol conversion module 154 strips Ethernet encapsulation, if any and sends out a Fibre Channel frame via adaptive PHY 140 and link 141.

Figure 2A:
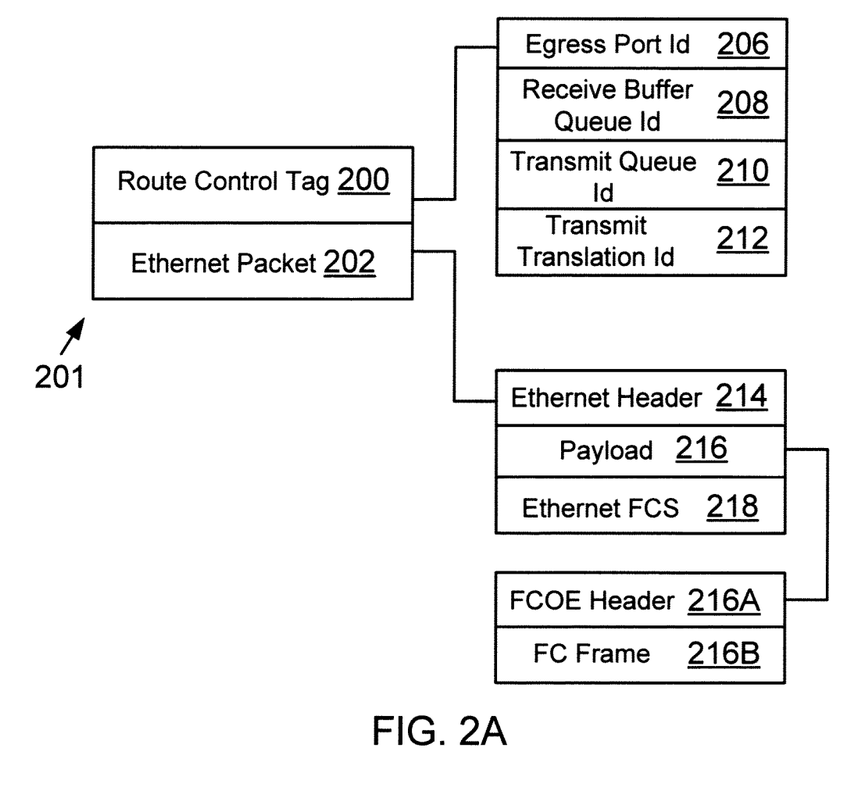
FIG. 2A shows an example of a packet format, according to one embodiment.

When operating in an Ethernet mode, the transmit conversion module 154 updates a source and/or destination MAC (media access control) address, recalculates Ethernet FCS (218, FIG. 2A). The conversion is based on a transmit translation identifier (212, FIG. 2B) that is included in the route control tag, which is then removed from the outgoing packets prior to transmission via adaptive PHY 140.

FIG. 2A shows an Extended Ethernet packet format 201 used by switch 118, according to one embodiment. The packet format 201 includes a routing control tag 200 that is added to a standard Ethernet packet 202. The routing control tag 200 may include an egress port identifier 206, a receive buffer identifier 208 where a packet may be stored after it is received by a Flex Port, and a transmit queue identifier 210 where a packet may be waiting for transmission via adaptive PHY 140. The route control tag 200 may also include a transmit translation identifier (Id) 212 that is used to perform translation as described below in more detail.

The Ethernet packet 202 includes a standard Ethernet header 214, an Ethernet payload 216 and an Ethernet frame check sequence (FCS) 218. The Ethernet payload 216 may include an FCoE packet that may include an FCoE header 216A and a Fibre Channel frame 216B.

Figure 2B:
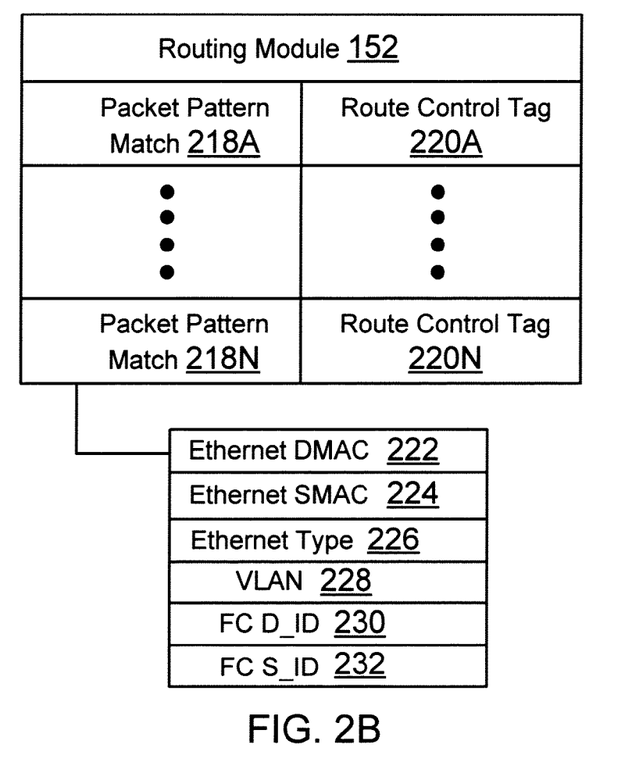
FIG. 2B shows an example of a routing module, according to one embodiment.

FIG. 2B shows an example of routing module (also referred to as a routing table or routing data structure) 152, according to one embodiment. The routing module 152 may be used to store a plurality of entry pairs (218A-218N/220A-220N), where each entry has a packet pattern match 218A-218N with a corresponding route control tag 220A-220N (similar to the route control tag 200 described above). The pattern match entry 218 may include a plurality of fields, for example, an Ethernet Destination MAC 222, an Ethernet Source MAC 224, an Ethernet type field 226, an identifier for a virtual local area network (VLAN) 228 a Fibre Channel destination identifier (D_ID) 230 and a Fibre Channel source identifier (S_ID) 232.

When a packet is received, the Ethernet header 214 is presented to the routing module 152 and if there is a match on any of the fields, then a corresponding routing tag is returned. The routing tag is then added to the packet. The packet with the routing tag is then placed at one of the receive buffer locations, as described above.

Figure 2C:
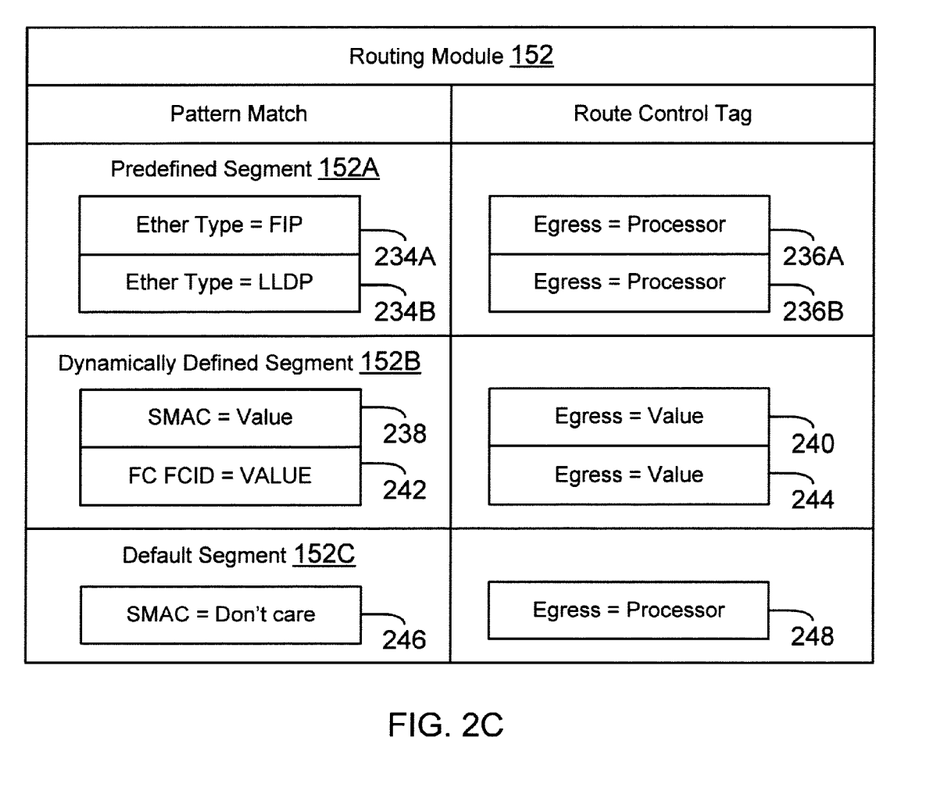
FIG. 2C shows example of routing module entries, according to one embodiment.

In one embodiment, as shown in FIG. 2C, routing data module 152 may be implemented as a ternary content addressable memory (TCAM) having the pattern match 218 with associated route control tags 220. Routing module 152 may include a plurality of segments, for example, a pre-defined segment 152A, a dynamically defined segment 152B and a default segment 152C. The pre-defined segment may have items that may have higher priority compared to the items in the default segment 152C. In one embodiment, the predefined segment 152A stores pattern match entries (for example, 234A and 234B) that recognize packets that are routed to processor 134 using routing tags 236A and 236B, respectively.

The dynamically defined segment 152B includes addresses that are learned during packet flow, as described below in detail. As an example, dynamically defined segment 152B may include a plurality of pattern match entries, shown as 238 and 242. Each stored packet pattern match entry has a corresponding value, for example, 240 and 244.

The default segment 152C may be used to learn the Ethernet source MAC as described below in more detail. As an example, the default segment 152C may include one or more entries, for example, 246 with a corresponding routing tag 248.

Figure 3A:
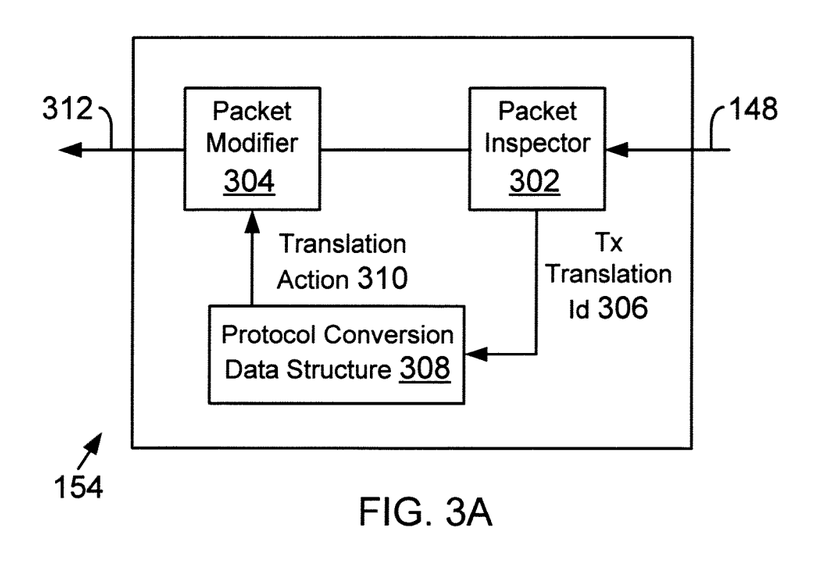
FIG. 3A shows a block diagram of a transmit side protocol conversion module, according to one embodiment.

FIG. 3A shows a block diagram of transmit protocol conversion module 154, according to one embodiment. The transmit protocol conversion module 154 includes a packet inspection module 302, a packet modifier 304 and a protocol conversion data structure 308 that are now described in detail.

The packet inspection module 302 receives a frame 148 that needs to be transmitted. The transmit translation identifier 306 (similar to 212, FIG. 2A) is extracted from frame 148 and then used as an index to determine translation action information 310 from the protocol conversion data structure 308. Data structure 308 includes a plurality of fields. The fields include translation identifiers having corresponding translation actions that need to be performed on frames that are to be transmitted.

As an example, transmit translation identifier 306 is used as an index to data structure 308. Translation action information 310 that matches the transmit translation identifier 306 is obtained from data structure 308 and then passed to packet modifier 304. Based on the translation action information 310, packet modifier module 304 performs the appropriate translation/modification on frame 148.

Figure 3B:
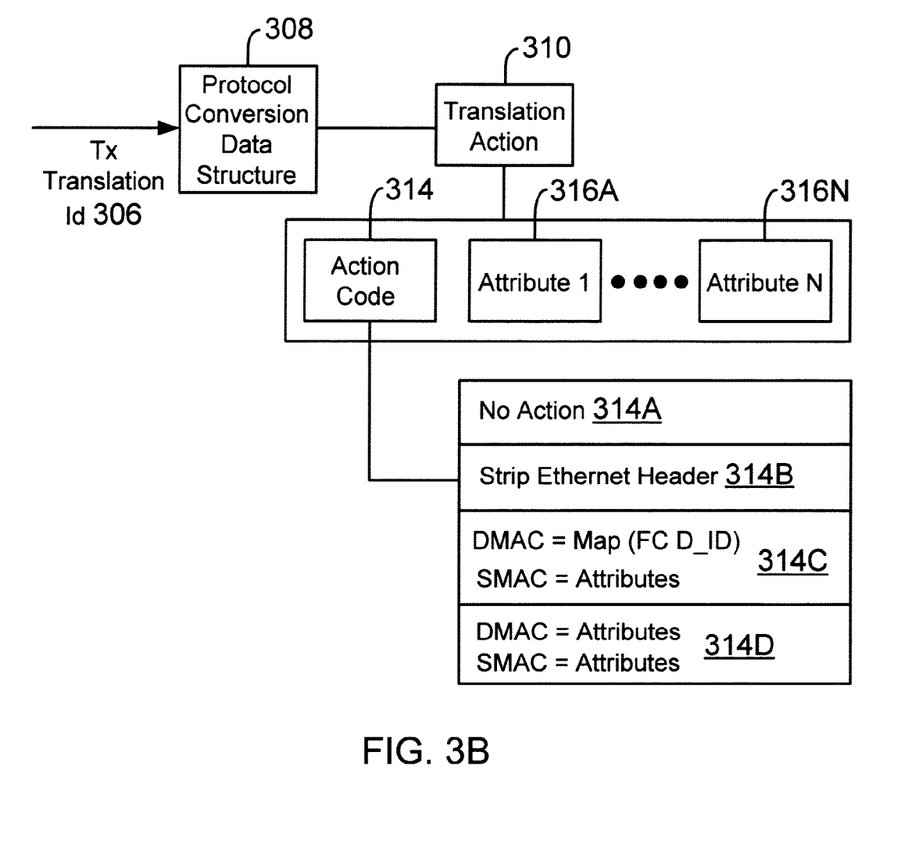
FIG. 3B shows an example of using the transmit side protocol conversion module, according to one embodiment.

FIG. 3B shows an example of the translation/modification that is performed based on translation action information 310, according to one embodiment. The translation action information 310 may include an action code 314 with attributes 316 shown as 316A-316N. The action code may include various options, for example, a "no action command 314A, a strip Ethernet header command 314B, a command 314C to map a destination MAC with a Fibre Channel destination identifier (D_ID) and to modify a source MAC based on attributes 316 and a command 314D for modifying a destination MAC and a source MAC.

In one embodiment, action code 314A may be used when packet 148 is transmitted without any modification. Action code 314B may be used to strip an Ethernet header and is used to support ports that are operating as Fibre Channel ports. Action code 314C is used to convert a destination MAC to an end node's MAC and a source MAC to an egress port's MAC address. Action code 314D is used to change a destination MAC to a destination port's MAC and a source MAC to an egress port's MAC.

Figure 4:
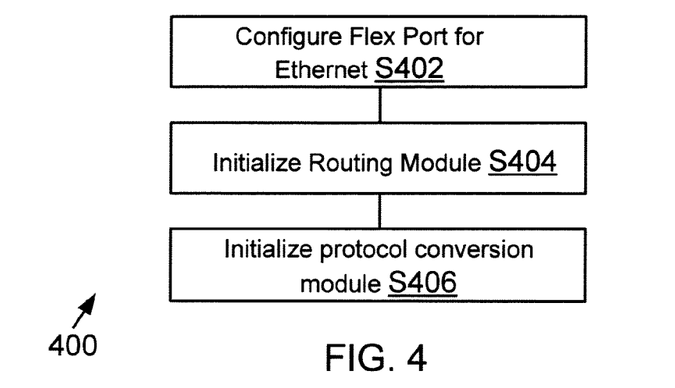
FIGS. 4-6 show process flow diagram, according to various embodiments of the present disclosure.

FIG. 4 shows a process 400 for initializing the Flex Ports operating as Ethernet server/storage ports and Ethernet LAN/FCoE fabric ports, according to one embodiment. The process begins in block S402, when a Flex Port is configured to handle Ethernet traffic. The Flex Ports may be configured by sending a command/signal from processor 134. The configuration settings depend on the entity to which the Flex Port is connected. For example, Flex Ports 120A-120C that are coupled to host systems 102A-102C, respectively and Flex Ports 120G and 120H coupled to Fibre Channel storage 130 and FCoE storage 132, respectively are configured differently from Flex Ports 120D and 120E. Flex Ports 120A-120C and 120G-120H may be referred to as Ethernet Server/Storage Ports. The remaining Flex Ports may be referred to as Ethernet LAN/FCoE SAN ports.

In block S404, the routing module 152 is initialized. For the Ethernet Server/Storage ports, the Ether Type is set to match an FCoE FIP Ether Type in the pre-defined segment 152A, while the default segment 152C is set to a "wildcard" match for LAN traffic for learning MAC addresses. For the Ethernet LAN/FCoE SAN Ports, the pre-defined segment 152A is set to match the FCoE FIP Ether type. The default segment 152C is set to drop frames because MAC learning may not be needed on fabric ports since MAC learning is enabled only on the server and storage ports, 120A-120C and 120G-120H.

In block S406, the transmit protocol conversion module 154 is set. These settings again would depend on how the Flex Ports are being used. For example, for the Ethernet Server/Storage Ports, the transmit protocol conversion module 154 is configured to store at least a first translation action 314A i.e. "no action" and 314C i.e. to map a destination MAC to a Fibre Channel D_ID. For the Ethernet LAN/FCoE SAN ports, the transmit protocol conversion module 154 includes the "no action" code 314A and an action code that changes a destination MAC to a destination port's MAC and a source MAC to an egress port's MAC.

Figure 5:
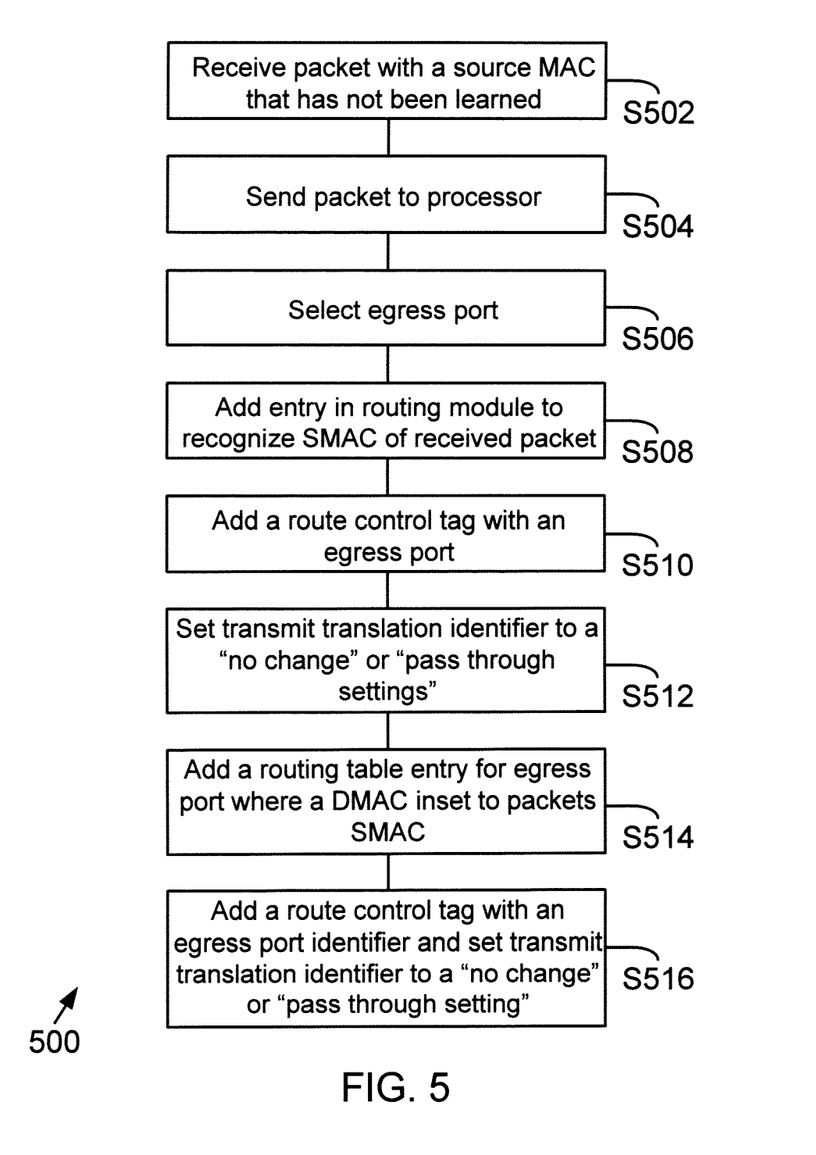

FIG. 5 shows a process flow diagram 500 for a MAC address learning process on a server port (for example, Flex Port 120A) and for establishing a path to and from an Ethernet LAN port (for example, Flex Port 120D). The process begins in block S502 when a packet with a source MAC that has not been learned is received, for example, at Flex Port 120A. The packet is examined by Flex Port 120A and a wild card match is triggered because the source MAC is not learned. The packet is then sent to processor 134 in block S504.

In block S506, an egress port is selected. In one embodiment, an Ethernet LAN port (for example, 120D) is selected based on configuration settings. The configuration settings may be stored as part of a data structure at Flex Port 120A or switch memory 136. The configuration information may be used to map a VLAN (virtual local area network) identifier value from the received packet to an Ethernet LAN port (for example, 120D).

In block S508, an entry is added to the routing module 152 for recognizing the source MAC of the received packet. The entry includes the source MAC for the packet pattern match 218. In block S510, a route control tag is set corresponding to an identifier for the egress port, while in block S512, a transmit identifier is set to "no change" or "pass through". This means when a packet with the learned SMAC is received at Flex Port 120A, it is passed on to the egress port selected in block S506, without making any changes.

In block S514, a routing table entry is set for the egress port, for example, 120D. In the routing table entry, a destination MAC is set based on the source MAC address of the received packet in block S502. A route control tag is also added in block S516, where an egress port identifier is set to Flex Port 120A. The transmit translation identifier is also set to "no change". This allows Flex Port 120D to route a packet that it receives to Flex Port 120A without any change.

Figure 6:
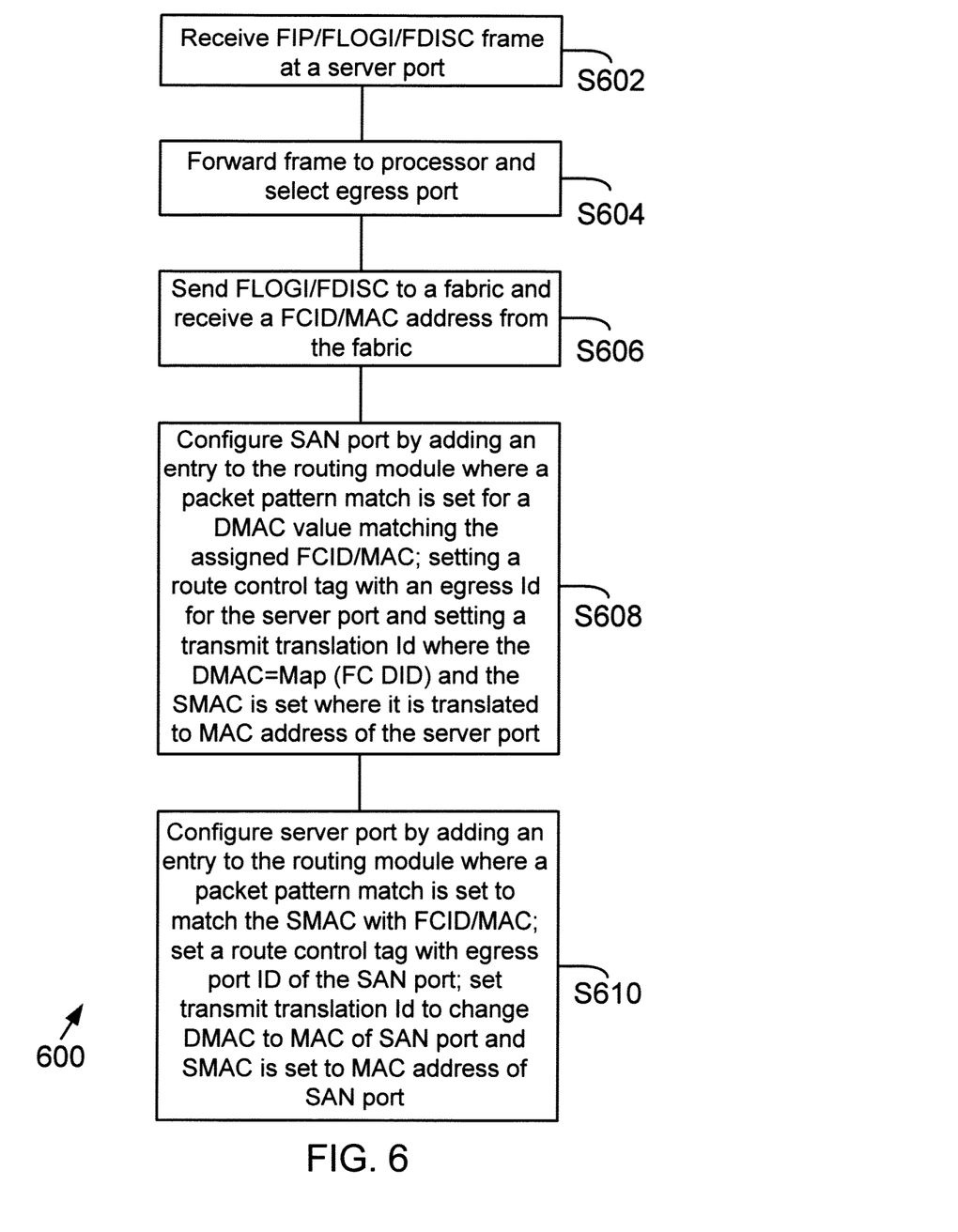

FIG. 6 shows a process 600 for establishing a path between a host system 120A and FCoE SAN 126 via an FCoE port, for example, Flex Port 120E, according to one embodiment. The process begins in block S602, when an initialization frame is received by the Flex Port 120A. The initialization frame may be a FIP/FLOGI/FDISC frame. A FIP frame is an FCoE initialization frame that is based on the FCoE standard. FIP frames are intended to discover and initialize FCoE entities that are connected to an FCoE Fabric. A FLOGI frame is used for Fabric login per the Fibre Channel standard. The FLOGI frame is sent by connected ports to an FCF using the FCF address. A FDISC frame is a login request frame that is similar to FLOGI, except it relies on an existing FLOGI session rather than initiating a new dedicated session with a fabric port.

In block S604, the received frame is sent by Flex Port 120A to processor 134. An egress port for the received frame is selected by processor 134. The egress port may be selected based on port configuration settings. For example, a VLAN setting or a defined relationship between Flex Port 120A and an FCoE SAN fabric port, for example, Flex Port 120E.

In block S606, the FCoE SAN port 120E sends the FLOGI/FDISC to an FCoE fabric (not shown) connected to the FCoE SAN 126. The FCoE fabric sends an "accept" response and provides a Fibre Channel identifier (FCID) and a MAC address for host system 102A on its adapter 116A port for the newly established session.

In block S608, the FCoE SAN attached port 120E is configured for processing packets that arrive at Flex Port 120E destined for adapter 116A via Flex Port 120A. An entry is added to the routing module 152 where the packet pattern match is set for a destination MAC value that matches the FCID and the MAC value received in block S606. A route control tag is also set which includes an identifier for the server port 120A. A translation identifier is set where the destination MAC address is mapped to the Fibre Channel destination identifier of adapter port 116A. The source MAC is also set so that it is translated to the MAC address of the FCF function on port 120A.

In block S610, the server port 120A is configured to route a packet to FCoE SAN 126 via Flex Port 120E. A routing table entry is added with a packet pattern match when the source MAC matches the FCID and MAC that was received in block S606. A route control tag is generated where the egress port is set to Flex Port 120E. The transmit translation identifier is set to change the destination MAC to a MAC address of the FCoE SAN 126 and the source MAC is set to the MAC address of Flex Port 120E. This allows a packet to be sent to FCoE SAN 126 via Flex Port 120E.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A network device, comprising:
a processor having access to a memory storage device storing instructions for execution by the processor;
a first flexible port having a physical layer that can be configured to operate as a first link type or a second link type based on a control signal sent by the processor;
wherein the first flexible port is coupled to a computing system using the first link type and receives a packet from the computing system;
wherein the first flexible port determines an egress flexible port for transmitting the packet to its destination and a routing module generates a route control tag for the packet, the route control tag includes an identifier identifying the egress flexible port, a location identifier identifying where the packet is stored at the first flexible port and a translation identifier identifying an action that is to be performed on the packet at the egress port before sending the packet to the destination;
wherein the routing module is implemented in a ternary content-addressable memory;
wherein the routing module includes a pre-defined segment, a dynamically defined segment and a default action segment, each segment storing a route control tag from a higher priority to a lower priority.

2. The device of claim 1, wherein the egress flexible port includes a transmit protocol conversion module that inspects the packet received from the first flexible port, retrieves the translation identifier from the packet and performs an action corresponding to the translation identifier.

3. The device of claim 2, wherein the transmit protocol conversion module maintains a protocol conversion data structure that stores action codes corresponding to a plurality of translation identifiers.

4. The device of claim 3, wherein the action codes include a code for transmitting the packet without any action, stripping a frame header, setting a destination media access control address and a source media access control address depending on a source port type and a destination port type.

5. The device of claim 1, wherein the first link type is Ethernet and a second link type is Fibre Channel.

6. The device of claim 1, wherein the first flexible port is a server port coupled to a server and the egress port is an Ethernet port.

7. The device of claim 1, wherein the first flexible port is a server port coupled to a server and the egress port is a Fibre Channel over Ethernet (FCoE) port coupled to a FCoE storage area network.

8. The device of claim 1, wherein the first flexible port is a server port coupled to a server and the egress port is a Fibre Channel port coupled to a Fibre Channel storage area network.

9. The device of claim 1, wherein the first flexible port is a server port coupled to a server and the egress port is a Fibre Channel port coupled to Fibre Channel storage system.

10. A network device, comprising:
a processor having access to a memory storage device storing instructions for execution by the processor;
a first flexible port having a physical layer that can be configured to operate as a first link type or a second link type based on a control signal sent by the processor;
an egress flexible port communicating with the first flexible port via a crossbar, the egress port having a physical layer that can be configured to operate as a first link type or a second link type based on a control signal sent by the processor
wherein the first flexible port includes a routing module for generating a route control tag for a packet received by the first flexible port, the route control tag includes an identifier identifying the egress flexible port, a location identifier identifying where the packet is stored at the first flexible port and a translation identifier identifying an action that is to be performed on the packet at the egress port before sending the packet to the destination;
wherein when the first flexible port is configured to operate as a server port for traffic, the routing module stores an ether type in a pre-defined segment of the routing match and a default segment is set to a wildcard setting for learning a media access control address (MAC) of incoming packets; and wherein when the first flexible port is configured to operate as a storage area network port or a local area network port, then the default segment is set without MAC learning;

wherein the routing module is implemented in a ternary content-addressable memory;

wherein the routing module includes a pre-defined segment, a dynamically defined segment and a default action segment, each segment storing a route control tag from a higher priority to a lower priority.

11. The device of claim 10, wherein the first flexible port includes a transmit protocol conversion module that inspects a packet, retrieves a translation identifier from the packet and performs an action corresponding to the translation identifier.

12. The device of claim 11, wherein the transmit protocol conversion module maintains a protocol conversion data structure that stores action codes corresponding to a plurality of translation identifiers.

13. The device of claim 11, wherein, when the egress port is configured to operate as a storage area network port, then it is configured to store an action code for changing a destination MAC address to a destination port's MAC and a source MAC to a MAC address of the egress port.

14. The device of claim 12, wherein the action codes include a code for transmitting the packet without any action, stripping a frame header, setting a destination media access control (MAC) address and a source MAC address depending on a source port type and a destination port type.

15. The device of claim 10, wherein the first link type is Ethernet and a second link type is Fibre Channel.

16. The device of claim 10, wherein the first flexible port is a server port coupled to a server and the egress port is a Fibre Channel over Ethernet (FCoE) port coupled to a FCoE storage area network.

17. The device of claim 10, wherein the first flexible port is a server port coupled to a server and the egress port is a Fibre Channel port coupled to a Fibre Channel storage area network.

18. The device of claim 10, wherein the first flexible port is a server port coupled to a server and the egress port is a Fibre Channel port coupled to Fibre Channel storage system.

* * * * *

UNITED STATES PATENT AND TRADEMARK OFFICE
CERTIFICATE OF CORRECTION

PATENT NO. : 8,953,606 B1
APPLICATION NO. : 13/433146
DATED : February 10, 2015
INVENTOR(S) : McGlaughlin et al.

It is certified that error appears in the above-identified patent and that said Letters Patent is hereby corrected as shown below:

In the Specification

In column 4, line 45, delete "FOP" and insert -- FCP --, therefor.

Signed and Sealed this
Fourteenth Day of July, 2015

Michelle K. Lee
*Director of the United States Patent and Trademark Office*